US010093017B2

(12) United States Patent
Birnbaum et al.

(10) Patent No.: US 10,093,017 B2
(45) Date of Patent: Oct. 9, 2018

(54) SAWHORSE

(71) Applicant: The Stanley Works Israel Ltd., Rosh Ha'Ayin (IL)

(72) Inventors: Miki Birnbaum, Rishon-le-Zion (IL); Michael Menirom, Raanana (IL); Eyal Zilberman, Petah Tikva (IL); Abraham Faibish, Jerusalem (IL); Robbie Tzemach, Hod HaSharon (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 0 days.

(21) Appl. No.: 15/287,080

(22) Filed: Oct. 6, 2016

(65) Prior Publication Data

US 2017/0106527 A1 Apr. 20, 2017

(30) Foreign Application Priority Data

Oct. 16, 2015 (EP) .................................... 15190296

(51) Int. Cl.
*B23Q 3/00* (2006.01)
*B25H 1/06* (2006.01)
(Continued)

(52) U.S. Cl.
CPC ............. *B25H 1/06* (2013.01); *B25H 1/0042* (2013.01); *B25H 1/04* (2013.01)

(58) Field of Classification Search
USPC ............ 269/308, 309; 182/155, 182.4, 186.2
See application file for complete search history.

(56) References Cited

U.S. PATENT DOCUMENTS 4,640,386 A * 2/1987 Hall ......................... B25H 1/06 182/155
4,880,080 A 11/1989 Brockman
(Continued)

FOREIGN PATENT DOCUMENTS

EP 2450156 A1 5/2012

OTHER PUBLICATIONS

David Bonnin, European Search Report, dated May 9, 2016, The Hague.
(Continued)

*Primary Examiner* — Joseph J Hail
*Assistant Examiner* — Shantese McDonald
(74) *Attorney, Agent, or Firm* — Bruce S. Shapiro; Carl E. Myers

(57) ABSTRACT

A sawhorse includes a body portion comprising an elongated portion, a first housing and a second housing. The first and second housings are connected to the elongated portion, with the second housing spaced from the first housing. First and second pairs of folding legs are pivotally attached to the first and second housing respectively, pivotable between open and folded positions. The first housing comprises a receiving region for receiving a distal end of the second pair of legs when in the folded position, the first receiving region comprising a first latch arranged to engage the second pair of legs, and the second housing comprises a second receiving region for receiving a distal end of the first pair of legs when in the folded position, the second receiving region comprising a second latch arranged to engage the first pair of legs.

12 Claims, 10 Drawing Sheets

(51) Int. Cl.
*B25H 1/04* (2006.01)
*B25H 1/00* (2006.01)

(56) References Cited

U.S. PATENT DOCUMENTS

| | | | | | |
|---|---|---|---|---|---|
| 5,007,502 | A * | 4/1991 | Shapiro | B25H 1/06 | 182/151 |
| 5,052,517 | A * | 10/1991 | Wallman | B25H 1/06 | 182/155 |
| 5,439,073 | A * | 8/1995 | Johnson | A47B 3/0818 | 182/153 |
| 2010/0288585 | A1* | 11/2010 | Katz | B25H 1/06 | 182/155 |

OTHER PUBLICATIONS

Annex to the European Search Report on European Patent Application No. EP 15 19 0296, dated Apr. 26, 2016.

* cited by examiner

SAWHORSE

CROSS-REFERENCE TO RELATED APPLICATIONS

This application claims priority under 35 U.S.C. § 119, to EP Patent Application No. 15190296.2 filed on Oct. 16, 2015, entitled "Sawhorse."

FIELD OF THE INVENTION

The present invention relates to sawhorses. Conventional sawhorses can be used in a number of ways to provide working surfaces and support for workpieces and tools. Sawhorses may be used in pairs in order to provide an extended working area. In order to assist transport between working locations, sawhorses may be foldable in a variety of ways.

BRIEF SUMMARY OF THE INVENTION

The aim of the present invention is to provide an improved folding sawhorse.

Sawhorses having two pairs of folding legs are known. For example, US 2010/288585 discloses a sawhorse comprising two pairs of folding legs, wherein each pair of legs is capable of being opened out into an A-frame shape in order to support the sawhorse in a working position.

The present invention provides a sawhorse, comprising a body portion, a first pair of folding legs and a second pair of folding legs, the body portion comprising an elongated portion, a first housing and a second housing, wherein the first housing is connected to the elongated portion, and the second housing is connected to the elongated portion at a distance from the first housing. The first pair of folding legs is pivotally attached to the first housing, and the second pair of folding legs is pivotally attached to the second housing, and the first pair of legs and the second pair of legs are each pivotable between an open position and a folded position. The first housing has a receiving region for receiving a distal end of the second pair of legs when the legs are in the folded position, the first receiving region having a first latch arranged to engage the second pair of legs, and the second housing has a second receiving region for receiving a distal end of the first pair of legs when the legs are in the folded position, the second receiving region comprising a second latch arranged to engage the first pair of legs.

At least one of the first and second latches may comprise a latch pin arranged to engage the respective one of the second or first pair of legs, and both of the first and second latches may comprise such a latch pin. The first and second latches may each comprise bias means arranged to bias the respective latch into a position wherein the latch can engage the respective pair of legs. The bias means may be a coil spring or a leaf spring, or any other biasing arrangement.

The latch pins or pins may each comprise an angled surface arranged to be contacted by a bearing surface of the respective one of the first or second pair of legs during movement of the respective pair of legs from the open position into the closed position, such that contact between the bearing surface and the angled surface may cause the respective latch pin to slide out of its latching position against the bias of the bias means.

The first latch pin may be substantially coaxial with the second pair of legs in the folded position, and the second latch pin may be substantially coaxial with the first pair of legs in the folded position.

The first and second housings may each comprise a formed structure with one or more reinforcement rods traversing the formed structure, such that the reinforcement rod or rods increase the rigidity of the formed structure. The one or more reinforcement rods may extend from one external side of the formed structure to a different external side of the formed structure.

The elongated portion of the body portion may comprise one or more parallel hollow metal bars wherein the interior of the bars is at least partially accessible when the sawhorse is in use. The hollow metal bar or bars may each be rectangular in cross-section. The first housing and second housing may be substantially formed of plastic.

At least part of the elongated portion may be adapted to allow attachment of mounting brackets for power tools.

BRIEF DESCRIPTION OF THE DRAWINGS

The invention is herein described, by way of example only, with reference to the accompanying drawings, wherein.

DETAILED DESCRIPTION OF THE DRAWINGS

Figure 1:
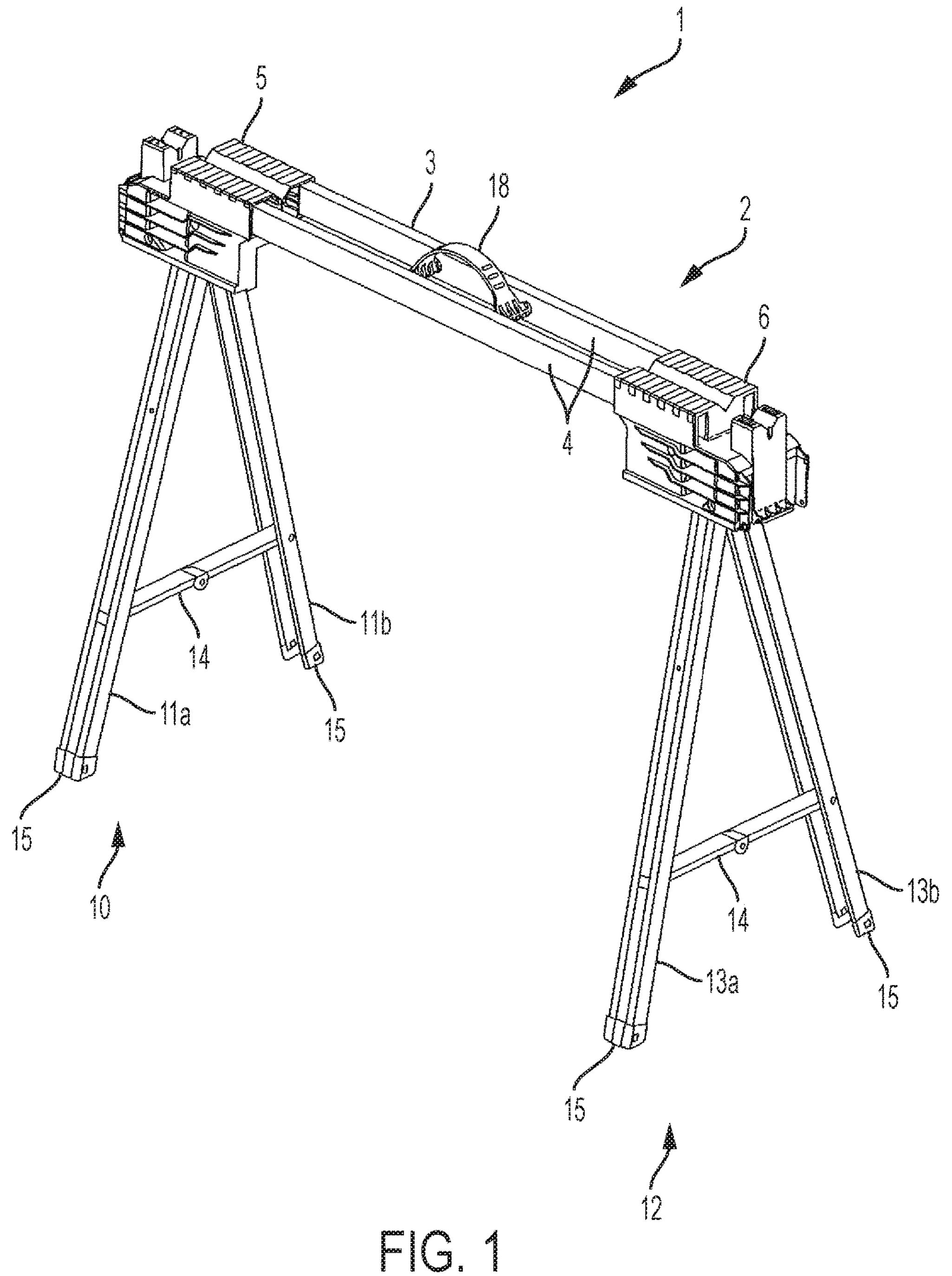
FIG. 1 is a perspective view of a folding sawhorse in accordance with the invention, in an open position.

FIG. 1 shows a sawhorse 1 in accordance with an embodiment of the present invention, in an open working position. The sawhorse 1 includes a body portion 2 having an elongated portion 3, a first housing 5 and a second housing 6. In the embodiment shown, the elongated portion comprises two parallel rods 4. The sawhorse includes a first pair of folding legs 10, with legs 11*a* and 11*b*, and a second pair of folding legs 12, with legs 13*a* and 13*b*. The legs 11*a*, 11*b*, 13*a* and 13*b* are movable between a closed position in which the legs are folded so that the sawhorse is relatively compact for storage or carrying, and an open position in which the legs can support the elongated portion in a condition for use as a support or work facilitation means.

The legs are preferably made of metal. Any suitable metal may be used, such as steel or aluminum. The distal ends of the legs 11*a*, 11*b*, 13*a*, 13*b* may be wholly or partially covered by shoes 15, which may be made of any suitable material such as plastic, rubber or elastomer, in order to reduce the risk of the legs slipping during use. Such shoes 15 may also act to protect the supporting floor surface and the user from direct contact with the distal ends of the legs.

The structure of the first pair of folding legs 10, comprising legs 11*a* and 11*b*, may be as follows, and it should be understood that the structure of the second pair of folding legs 12 may be similar but will not be described in detail. Legs 11*a* and 11*b* are pivotable relative to each other, such that when they are moved out of the closed position, they may be pivoted apart to form an 'A-frame' as shown in FIG. 1, wherein a hinged connecting bar 14 limits the maximum separation of the bottom ends of the legs 11*a* and 11*b*. Alternatively, the first and second pairs of folding legs may have any other known suitable structure which allows the sawhorse to be used as a support or work facilitation device.

Figure 2:
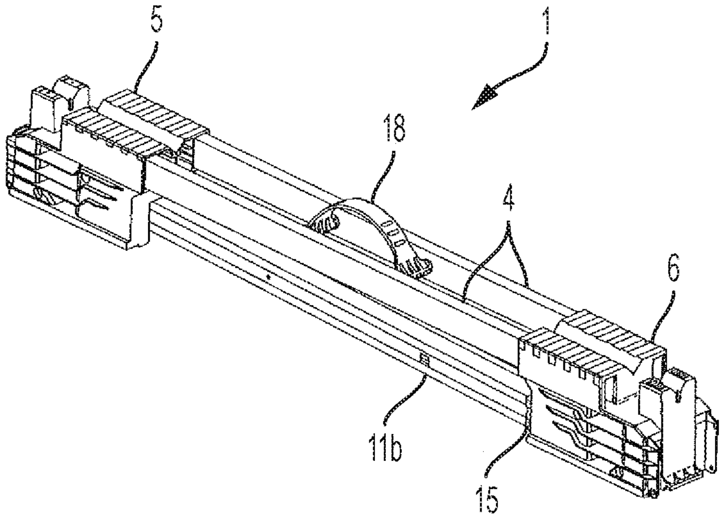
FIG. 2 is a perspective view of the sawhorse of FIG. 1, in a closed position.

In FIGS. 1 and 2, the elongated portion 3 comprises two bars 4 of rectangular cross-section, which may be hollow in part or throughout. The two bars 4 are both separately attached to the first housing 5 and to the second housing 6, and are fixed parallel to each other with a narrow gap between them. A carry handle 18 may be attached between the two bars 4, or in alternative arrangements having more bars, such handle may be attached between any two or to any one of such bars. Preferably, such a carry handle is made of a plastic or fabric which is flexible enough that it can be flexed or folded downwards between the bars to allow full access to the top supporting surfaces of the sawhorse when it is in use.

Figure 4A:
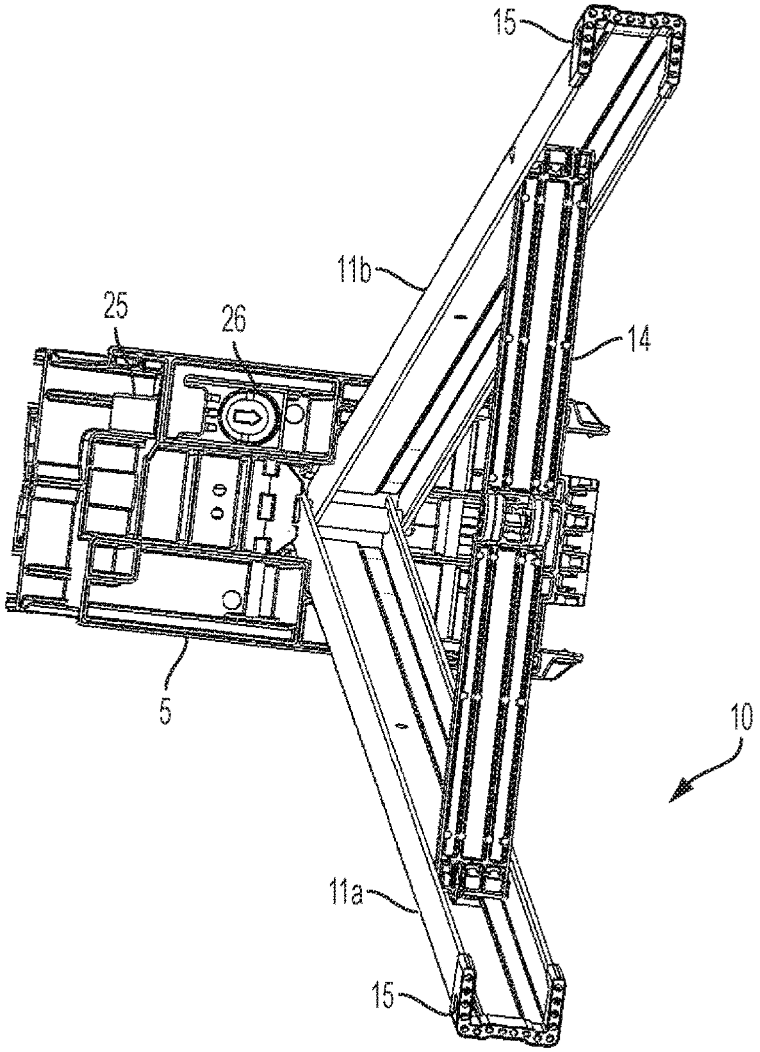
FIG. 4*a* is a close up perspective view of one end of the sawhorse of FIG. 1 wherein the pair of legs is shown pivoted apart.
Figure 4B:
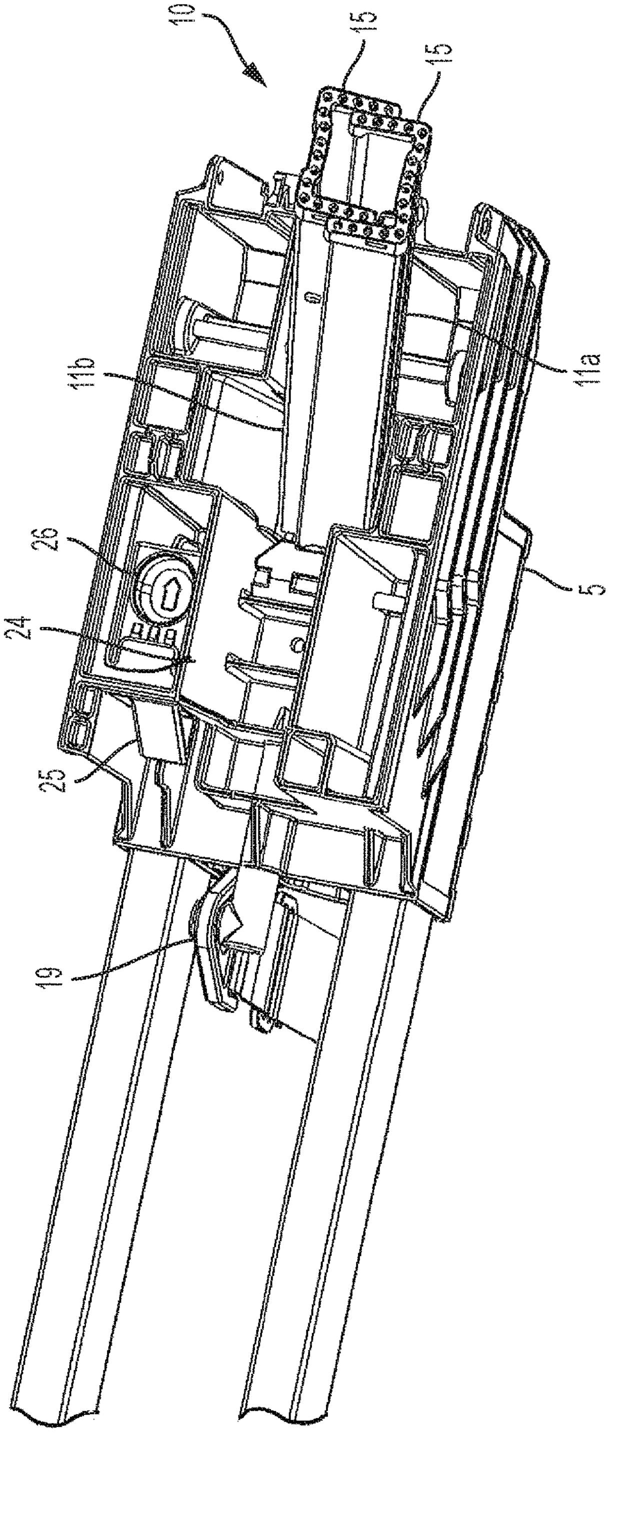
FIG. 4*b* is a similar view wherein the pair of legs is pivoted together.

Additional or alternative points for attachment of carrying handles or straps may be provided at other convenient locations on the sawhorse, for example, as best shown in FIG. 4*b*, attachment points for a carry strap, such as attachment point 19, may be provided on the opposing facing surfaces of the first and second housings 5 and 6.

Figure 3:
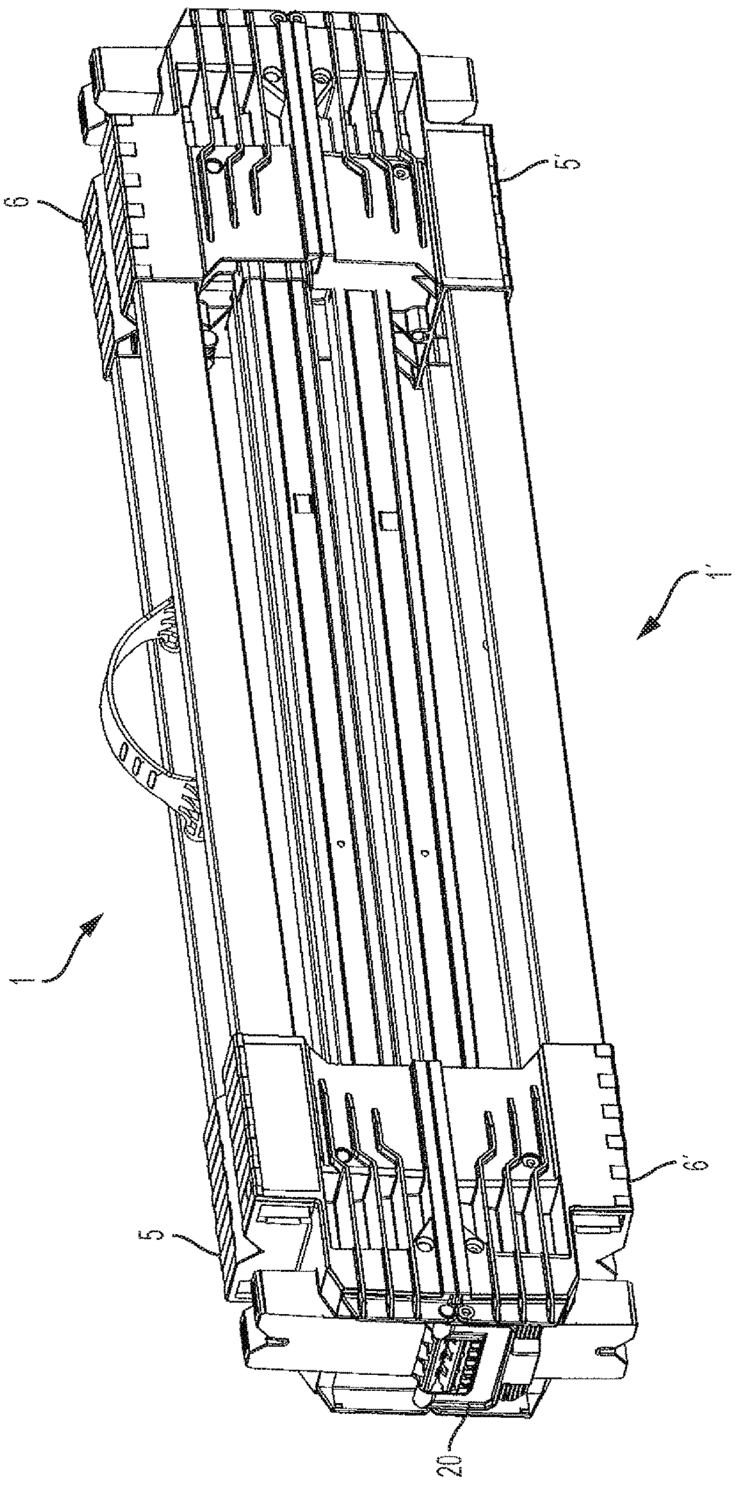
FIG. 3 is a perspective view of two of the sawhorses of FIG. 1, in the closed position and latched to each other.
Figure 9:
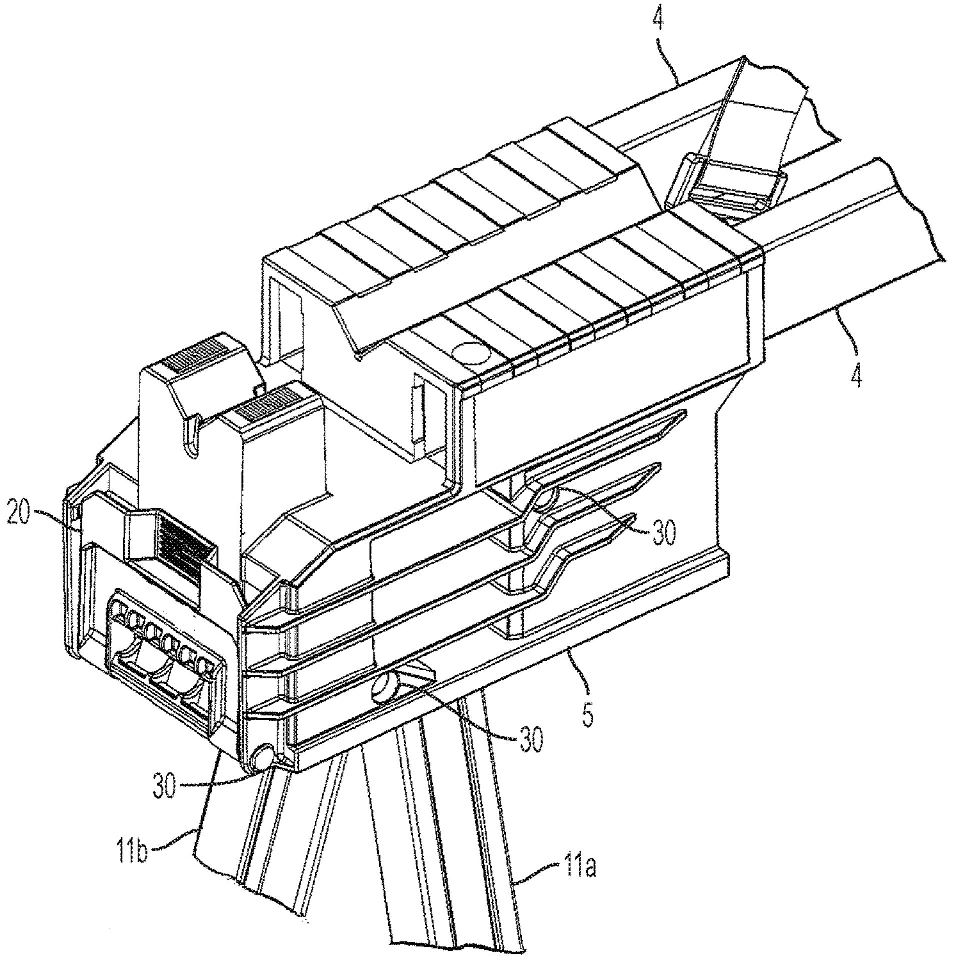
FIG. 9 is a close up perspective view of one end of the sawhorse of FIG. 1.

FIG. 2 shows the sawhorse of FIG. 1 with the legs in a folded position, such that the sawhorse can be carried or stored conveniently. Only one of the legs, leg 11*a*, is visible in this view. FIG. 3 shows two folded sawhorses 1, 1', similar to the sawhorse of FIG. 2, latched onto each other by means of side latches 20, such that a pair of sawhorses can easily be carried or stored together. Preferably, each of the two sawhorses is identical to the other, and each has a side latch 20, 20' (not shown) attached to the outer side of first housing 5, 5', and one side latch receiving catch on the outer side of first housing 6, 6'. First housing 5 is latched to second housing 6' of the sawhorse 1' by side latch 20, and first housing 5' is latched to second housing 6 of sawhorse 1 by side latch 20'. Latch 20 is also shown in FIG. 9, in an unlatched position.

FIG. 4*a* is shows one end of the sawhorse of FIG. 1 from below, with the pair of legs in the open A-frame position. In FIG. 4*b*, the same pair of legs have been pivoted with respect to each other around pivot pin 22 (shown in FIG. 5), into a closed position. The legs 11*a* and 11*b* are formed of bent metal profile, and are attached in a slight offset such that they can nest within each other when closed. A passage 24 is formed in the underside of first housing 15, such that the folded pair of legs 10 can be folded towards the elongated portion into the fully closed position.

Figure 5:
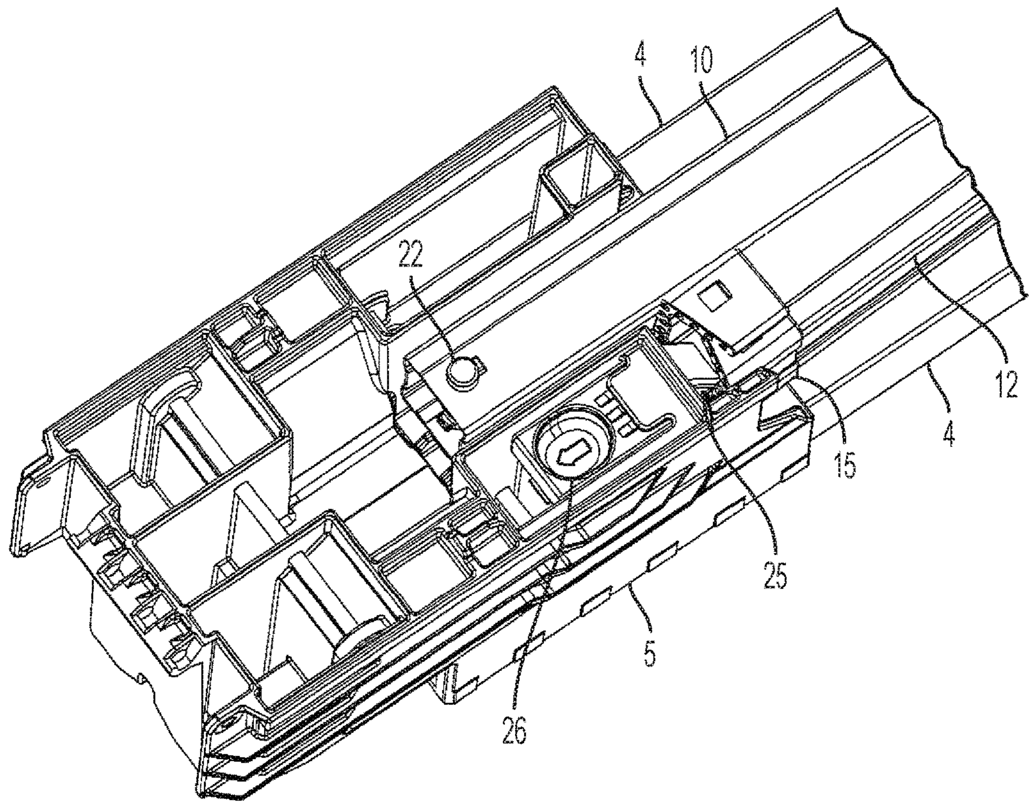
FIG. 5 is a close up perspective view of one end of the sawhorse of FIG. 1.

FIG. 5 shows a view of a latch pin 25 latching pair of legs 12 (of which only the distal end is shown), into a closed position. The attached end of pair of legs 10 is also shown in the folded closed position. In normal use, the sawhorse may be turned so that the normal working surface is on the floor in order to fold or unfold the sawhorse. The latch pin 25 is provided with a slider 26 so that a user can easily slide the latch pin 25 away from the latched position such that the respective pair of legs 10, 12 are no longer engaged by the latch pin 25. The pair of legs can then be pivoted into the open position, and when both pairs of legs are fully open, the sawhorse can be positioned ready for use.

Figure 6:
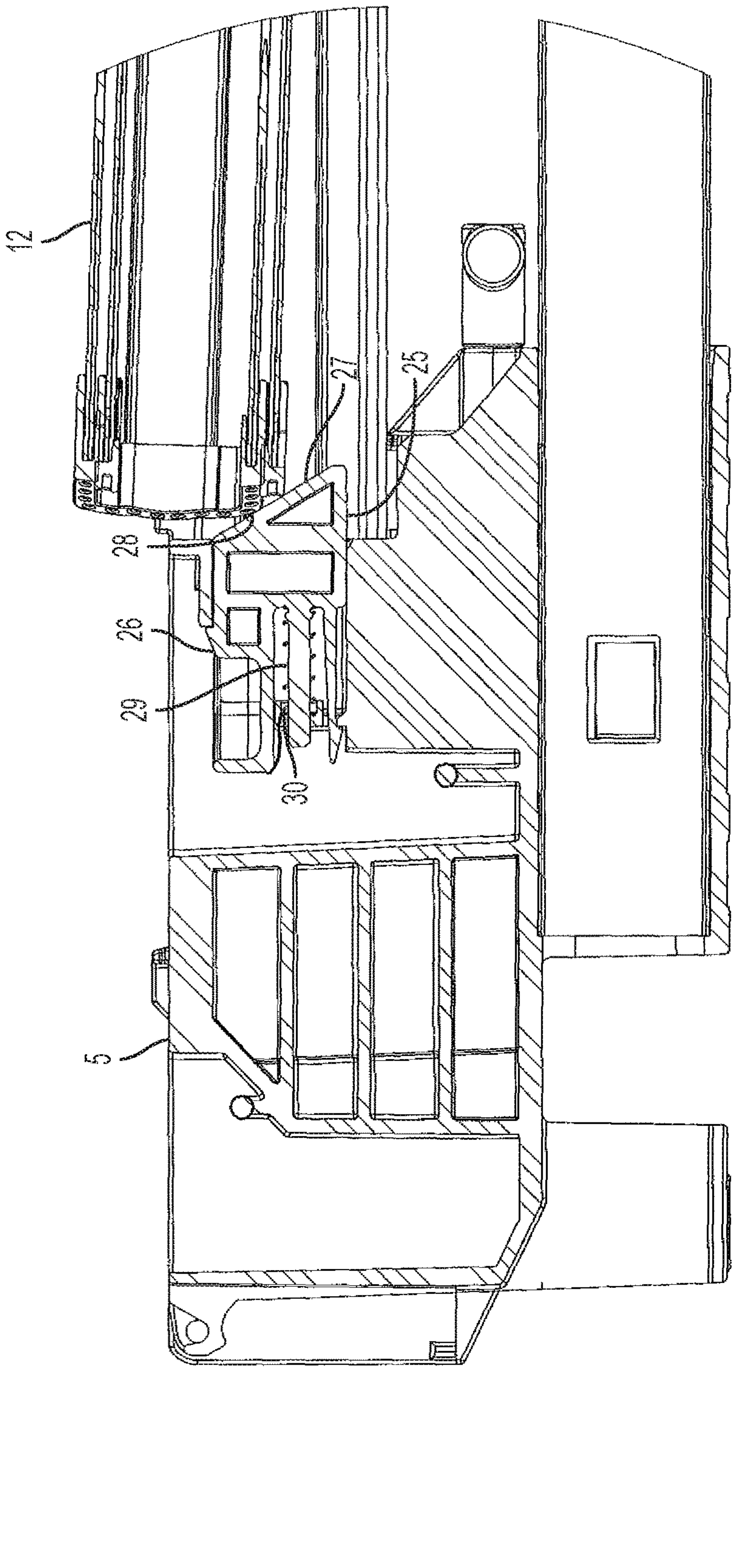
FIG. 6 is a sectional side view of part of the sawhorse of FIG. 1, when one pair of legs is being moved towards the closed position.
Figure 7:
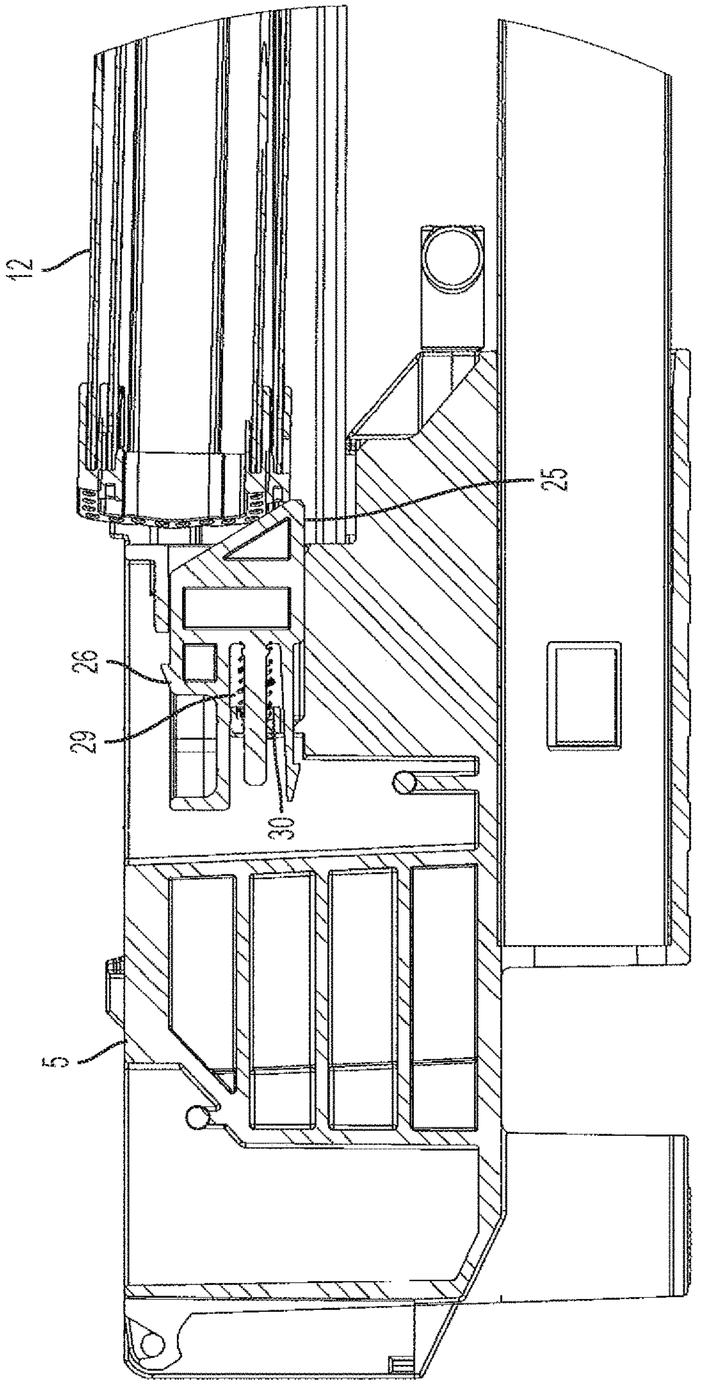
FIG. 7 is a sectional side view of part of the sawhorse of FIG. 1, when one pair of legs is being moved further towards the closed position.
Figure 8:
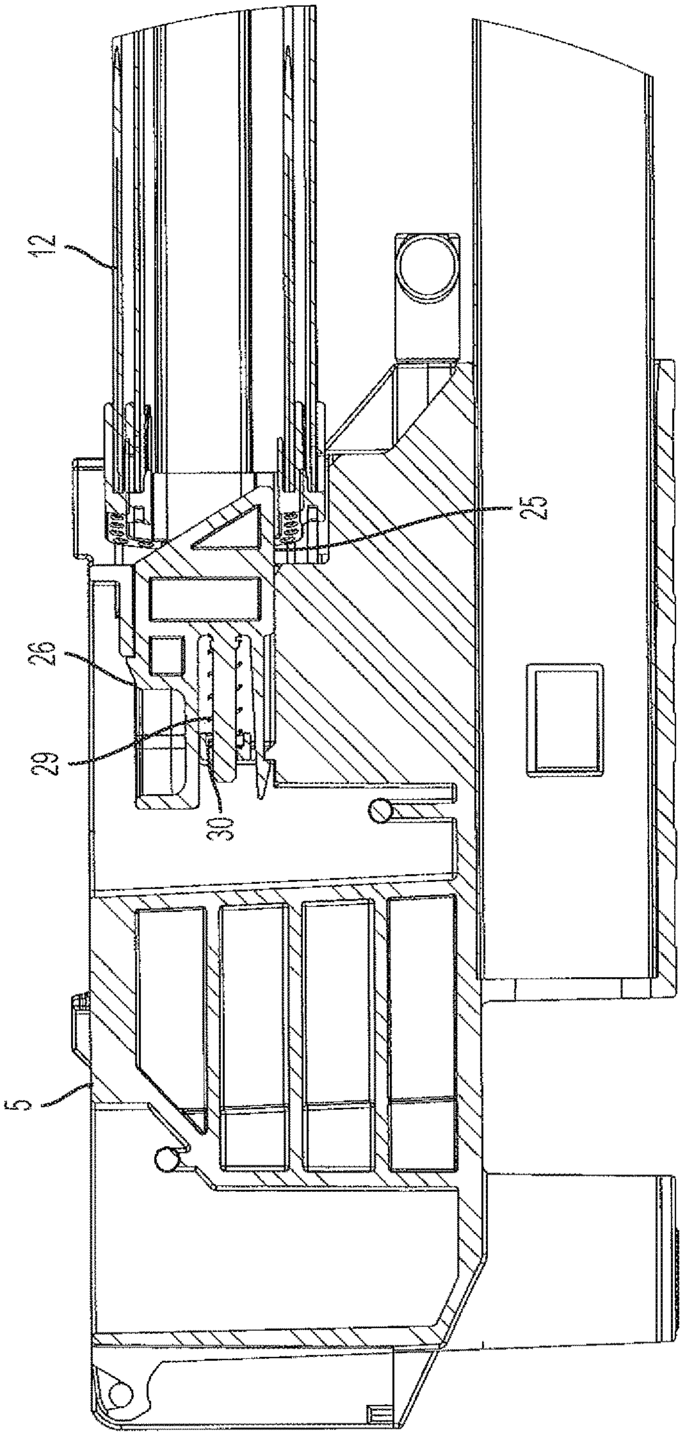
FIG. 8 is a sectional side view of part of the sawhorse of FIG. 1, when one pair of legs is in the closed position.

FIGS. 6, 7 and 8 are side cross-sectional views, showing the distal end of a pair of legs folding into the closed position. In FIG. 6, a bearing surface 28 of the distal end of the pair of legs has contacted an angled surface 27 of the latch pin. In FIG. 7, the bearing surface 28 has engaged the angled surface 27, and continued movement of the legs towards the folded position has started to force the latch pin 25 to slide to the left of the figure, against a bias provided by coil spring 29. Coil spring 29 is compressed against spring stop 30 of the first housing 5, and the latch pin slides relative to first housing 5. In FIG. 8, the bearing surface has cleared the angled surface of the latch pin 25, the pair of legs 12 has reached the folded position, and the latch pin 25 has been forced towards the right of the figure into the latched position by coil spring 29. The pair of legs 12 are now securely latched into the folded position, until the user chooses to activate the latch pin 25 by moving the slider 26 against the bias of the coil spring 29 in order to release the legs from the latched position.

In this way, each pair of legs can be latched into the folded position independently and reliably. This increases the ease with which the sawhorse can be carried between worksites, and allows two similar sawhorses to be latched onto each other by engagement latches for carrying if required. The person skilled in the art will appreciate that the spring need not be a coil spring, but may be any other known type of biasing mechanism, and that the latch pin may take alternative forms, as long as the latch pin allows engagement of the legs in the folded position.

FIG. 9 illustrates positions in which reinforcement rods or bars such as rivets 30 may be provided in the first and/or second housing, in order to increase the rigidity of the housings and provide general strengthening. FIG. 9 shows three separate long rivets 30 which traverse the first housing 5 from one side (shown) to the opposite side (not shown), such that the housing is strengthened against forces which may tend to shear or crush the housing or force the two rods 4 of the elongated portion away from or towards each other. Such rivets 30 may also provide additional structural strength at pivot points such as the leg pivot points or pivot points of the attachment latch 20 as shown. Such rivets 30 are preferably made of metal, but may be made of any suitably strong material.

The sawhorse of the present invention may be used to support a large variety of workpieces and tools during use, for example, the sawhorse may facilitate the use of power tools such as miter saws, drill presses, jigsaws, table saws and the like.

Persons skilled in the art will recognize that extensions can be added to the sawhorse as is known in the art. Extensions may be attached to attachment points provided on the first or second housings. Alternatively, extensions may be attached by interaction with the rod or rods of the elongated portion 3, for example by being inserted into the hollow interior of a rod or rods. Such extensions may include workpiece roller supports, which can be used to support elongated workpieces, such as moldings, etc., so that the user can cut it accurately. Alternatively, or additionally, one or more clamps or mounting brackets may be attached to the elongated portion 3, and may be slidable thereon, as known in the art. Such clamps or mounting brackets may allow a range of power tools to be used with the sawhorse, or may facilitate particular arrangements of workpieces on the sawhorse. The clamps or mounting brackets may be integrated parts of a power tool housing, or may be separate pieces of equipment by means of which a variety of different tools or items may be supported on the elongated portion.

It will be recognized that the number, shape and size of the rods or top rails forming the elongated portion may be different to those shown in the examples herein, while retaining certain benefits of the invention. The rod or rods may be adapted to suit particular situations, for example they may be shaped differently in order to adapt the sawhorse better to higher maximum loading or lower maximum loading, as desired. The rod or rods may be hollow or solid, and may have any convenient cross-section, including rectangular, square, triangular or circular. The rod or rods may be formed of metal, such as extruded aluminum, bent steel, fabricated sheet metal, or any other suitable material. The use of hollow rods may increase resistance of the sawhorse to torsional and lateral loads, while minimizing the weight of the sawhorse.

It should be understood that although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the claims.

The invention claimed is:

1. A sawhorse (1) comprising:

a body portion (2) including an elongated portion (3), a first housing (5) and a second housing (26), wherein the elongated portion 131 is disposed between the first housing (5) and the second housing (6);

a first pair of legs (10) pivotally attached to the first housing (5) at one end and comprising, at a distal end, a first bearing surface (28) that defines an opening, and wherein said first pair of legs (10) is movable between an open position wherein the first pair of legs (10) is configured to support the body portion (2) and a folded position, wherein the first bearing surface (28) is disposed in the second housing (6);

a second pair of legs (12) pivotally attached to the second housing (6) at one end and comprising, at a distal end, a second bearing surface (28) that defines an opening, and wherein said second pair of legs (12) is movable between an open position wherein the second pair of legs (12) is configured to support the body portion (2), and a folded position, wherein the second bearing surface (28) is disposed in the first housing (10); and at least one latch pin (25) comprising a plunger and a bias means 29 disposed in either the first housing (5) or the second housing (6), said bias means configured to bias the plunger into engagement with the opening defined by either the first bearing surface (28) or the second bearing surface (28) when the respective first pair of legs (10) or second pair of legs (12) are in their folded position.

2. A sawhorse (1) according to claim 1, wherein the plunger comprises an angled surface (27) configured to be contacted by the respective bearing surface (28) of either the first pair of legs (10) or second pair of legs (12) when moving the respective pair of legs into its folded position such that the contact between the respective bearing surface (28) and the angled surface (27) may cause the plunger to slide against its bias means (29) until the bearing surface clears the angled surface (27), at which point, the bias means biases the plunger into engagement with the respective opening.

3. A sawhorse (1) according to claim 1, wherein the at least one latch pin (25) further comprises a slider (26) configured to allow selective movement of the plunger against the bias means (29).

4. A sawhorse (1) according to claim 1, wherein the bias means (29) is a coil spring or a leaf spring.

5. A sawhorse (1) according to claim 1, wherein a latch pin (25) is disposed in both the first housing (5) and the second housing (6).

6. A sawhorse (1) according to claim 5, wherein the latch pin (25) of the first housing (5) is substantially coaxial with the second pair of legs (12) in the folded position, and the latch pin (25) of the second housing (6) is substantially coaxial with the first pair of legs (10) in the folded position.

7. A sawhorse (1) according to claim 6, wherein the first and second housings (5, 6) each comprise a formed structure with one or more reinforcement rods traversing the formed structure, such that the reinforcement rod or rods increase the rigidity of the formed structure.

8. A sawhorse (1) according to claim 7, wherein the one or more reinforcement rods extend from one external side of the formed structure to a different external side of the formed structure.

9. A sawhorse (1) according to claim 1, wherein the elongated portion (3) comprises one or more parallel hollow metal bars, and the first housing (5) and second housing (6) are substantially formed of plastic; wherein the interior of the one or more hollow metal bars is accessible when the sawhorse (1) is in use.

10. A sawhorse (1) according to claim 9, wherein the hollow metal bar or bars are each rectangular in cross-section.

11. A sawhorse (1) according to claim 10, wherein at least part of the elongated portion (3) is adapted to allow attachment of mounting brackets for power tools.

12. A sawhorse (1) according to claim 1 wherein the first housing (5) further comprises a side latch (20) and the second housing (6) further comprises a side latch catch.

* * * * *